(12) United States Patent
Morishita

(10) Patent No.: US 6,185,373 B1
(45) Date of Patent: Feb. 6, 2001

(54) MIRROR CONTROL APPARATUS FOR MIRROR IN SINGLE LENS RELEX CAMERA

(75) Inventor: Shigeru Morishita, Tokyo (JP)

(73) Assignee: Asahi Kogaku Kogyo Kabushiki Kaisha, Tokyo (JP)

(*) Notice: Under 35 U.S.C. 154(b), the term of this patent shall be extended for 0 days.

(21) Appl. No.: 09/342,238

(22) Filed: Jun. 29, 1999

(30) Foreign Application Priority Data

Jul. 1, 1998 (JP) .................................................. 10-185949
Jul. 3, 1998 (JP) .................................................. 10-188616

(51) Int. Cl.[7] ............................ G03B 17/00; G03B 19/12
(52) U.S. Cl. .............................................. 396/50; 396/358
(58) Field of Search .................................... 396/358, 352, 396/50

(56) References Cited

U.S. PATENT DOCUMENTS 3,852,791 * 12/1974 Eukuda ................................. 396/358
5,606,380    2/1997 Tatamiya .............................. 396/358

* cited by examiner

Primary Examiner—W. B. Perkey
(74) Attorney, Agent, or Firm—Greenblum & Bernstein, P.L.C.

(57) ABSTRACT

A mirror control apparatus 100; 200 for controlling a mirror 20 in a single lens reflex camera 10. The mirror 20 is supported for reciprocal rotation between a first position in a photographing light path POP and a second position out of the photographing light path POP. The mirror control apparatus 100; 200 comprises a drive mechanism 102; 202 and a brake mechanism 104; 204. The drive mechanism 102; 202 is operatively connected to the mirror 20 for applying drive power to the mirror 20 for rotation between the first and second positions. The brake mechanism 104; 204 is operatively connected to the mirror 20 for producing brake power which varies depending on at least one of factors affecting rotation of the mirror, the brake power serving as resistance against rotation of the mirror 20. Such factors include temperature in the camera 10 and orientation of the camera 10 relative to the gravity. Appropriate brake power may be always produced against rotation of the mirror in order to effectively avoid any harmful shocks to and bounces of the mirror under different conditions of the single lens reflex camera which may occur.

21 Claims, 7 Drawing Sheets

MIRROR CONTROL APPARATUS FOR MIRROR IN SINGLE LENS RELEX CAMERA

The present disclosure relates to subject matter contained in Japanese Patent Application Nos. Hei-10-185949 and Hei-10-188616 filed on Jul. 1, 1998 and Jul. 3, 1998, respectively, which are expressly incorporated herein by reference in their entireties.

BACKGROUND OF THE INVENTION

1. Field of the invention

The present invention relates to a mirror control apparatus for a mirror in a single lens reflex camera.

2. Description of the Related Art

A single lens reflex (SLR) camera has a mirror disposed in a camera body and supported for reciprocal rotation between a first position in a photographing light path and a second position out of the photographing light path. The mirror is normally positioned at the first position, at which it is angled at forty-five degrees, serving to reflect light coming through the lens onto the viewing screen of a viewfinder.

The mirror is driven by a mirror control apparatus for quick rotation from the first to the second position and then from the second to the first position, so that it tends to impact onto a part of the camera body when reaching either of the positions. In order to prevent any harmful shocks to the mirror and/or to the camera body, as will as bounces of the mirror, from occurring when the mirror reaches these positions, cushions are typically used to receive the mirror at these positions so as to absorb the shocks. The shock absorbing capability of such cushions are, however, relatively limited. More effective shock absorption may be achieved by using a mirror brake mechanism which produces brake power against rotation of the mirror.

Typical mirror brake mechanisms include a friction brake comprising a disk operatively connected to and rotatable in synchronism with the mirror and a brake shoe for applying frictional brake force to the disk when the mirror is travelling in a selected angular position range. The brake shoe is urged to and in frictional contact with the peripheral edge of the disk only in a selected sectorial region thereof, which corresponds to the selected angular position range of the mirror. The selected angular position range is the range the mirror travels through when it is reaching the second position. The friction brake therefore provides brake power against the rotation of the mirror only when the mirror is reaching the second position. This facilitates smooth stopping of the mirror at the second position so as to avoid any harmful shocks and bounces.

Unfortunately, such type of mirror brake mechanisms suffer from certain inconveniences. Although the brake power to be produced by the friction brake is carefully chosen to have a desired value, the desired value itself may change depending on various factors affecting rotation of the mirror.

Such factors include, for example, temperature in the environment of the camera and orientation of the camera relative to the gravity. Specifically, when the camera is subjected to a low temperature, the viscosity of lubricant applied to pivots and sliding parts in the camera increases, resulting in an increase in resistance caused by lubricant against motions of moving parts. This in turn leads to a reduction in velocity of the mirror being rotated, and thus to a reduction in the desired brake power. In such case, lower brake power is desirable or, in other words, the actual brake power is too high to ensure appropriate motion of the mirror. Further, the brake power to be produced by the friction brake is chosen to be at an appropriate level just when the camera is in its normal orientation, where the mirror will snap up against the gravity during rotation from the first to the second position. Thus, if the camera is held by the photographer, for example, with its right or left side oriented up or down, the mirror will rotate about a vertical axis and thus not against the gravity. In such case, the velocity of the mirror when reaching the second position is relatively high so that higher brake power is desirable, and therefore the actual brake power is too low to achieve appropriate motion of the mirror.

SUMMARY OF THE INVENTION

In view of the foregoing, it is an object of the present invention to provide a mirror control apparatus for a mirror in a single lens reflex camera, the mirror being supported for reciprocal rotation between a first position in a photographing light path and a second position out of the photographing light path, in which appropriate brake power may be always produced against rotation of the mirror in order to effectively avoid any harmful shocks to and bounces of the mirror under different conditions of the single lens reflex camera which may occur.

In accordance with one aspect of the present invention, there is provided a mirror control apparatus for a mirror in a single lens reflex camera, in which the mirror is supported for reciprocal rotation between a first position in a photographing light path and a second position out of the photographing light path. The mirror control apparatus comprises a drive mechanism and a brake mechanism. The drive mechanism is operatively connected to the mirror for applying drive power to the mirror for rotation between the first and second positions. The brake mechanism is operatively connected to the mirror for producing brake power which varies depending on at least one of factors affecting rotation of the mirror, the brake power serving as resistance against rotation of the mirror.

The brake mechanism may preferably produce brake power only when the mirror is travelling through at least one predetermined partial region within its rotational stroke between the first and second positions.

In such case, the brake mechanism may preferably produce brake power when the mirror is reaching the second position. Further, the brake mechanism may preferably produce brake power when the mirror is reaching each of the first and second positions.

The brake mechanism may preferably produce brake power which varies depending on temperature in the camera. Additionally or alternatively, the brake mechanism may preferably produce brake power which varies depending on orientation of the camera relative to the gravity.

In one embodiment, the brake mechanism comprises a friction brake. The friction brake may comprise a disk operatively connected to and rotatable in synchronism with the mirror, a brake shoe supported by a stationary part of the camera for movement toward and away from the disk and capable of contact with the disk; and an urging device for urging the brake shoe toward the disk with a variable urging force compensated for a change in temperature in the camera.

In another embodiment, the brake mechanism comprises an induction brake unit and control circuitry associated with the induction brake unit. The control circuitry may comprise an angular position sensor for detecting angular position of the mirror relative to the camera and providing an angular position signal indicative of detected angular position of the mirror, a temperature sensor for detecting temperature in the camera and providing a temperature signal indicative of detected temperature in the camera, an orientation sensor for detecting orientation of the camera relative to the gravity and providing an orientation signal indicative of detected orientation of the camera, and a brake unit controller responding to the angular position signal, the temperature signal and the orientation signal by controlling the induction brake unit so as to control brake power to be produced by the induction brake unit.

In accordance with another aspect of the present invention, there is provided a mirror control apparatus for a mirror in a single lens reflex camera, in which the mirror is supported for reciprocal rotation between a first position in a photographing light path and a second position out of the photographing light path. The mirror control apparatus comprises a drive mechanism and a brake mechanism. The drive mechanism is operatively connected to the mirror for applying drive power to the mirror for rotation between the first and second positions. The brake mechanism is operatively connected to the mirror for producing brake power serving as resistance against rotation of the mirror. Further, the brake mechanism comprises an induction brake unit and control circuitry associated with the induction brake unit.

The control circuitry may comprise an angular position sensor for detecting angular position of the mirror relative to the camera and providing an angular position signal indicative of detected angular position of the mirror, a temperature sensor for detecting temperature in the camera and providing a temperature signal indicative of detected temperature in the camera, an orientation sensor for detecting orientation of the camera relative to the gravity and providing an orientation signal indicative of detected orientation of the camera, and a brake unit controller responding to the angular position signal, the temperature signal and the orientation signal by controlling the induction brake unit so as to control brake power to be produced by the induction brake unit.

BRIEF DESCRIPTION OF THE DRAWINGS

The above and other objects, features and advantages of the present invention will be apparent from the following detailed description of preferred embodiments thereof, reference being made to the accompanying drawings, in which.

DETAILED DESCRIPTION OF PREFERRED EMBODIMENTS

Referring now to the accompanying drawings, preferred embodiments of the present invention will be described in detail.

Figure 1:
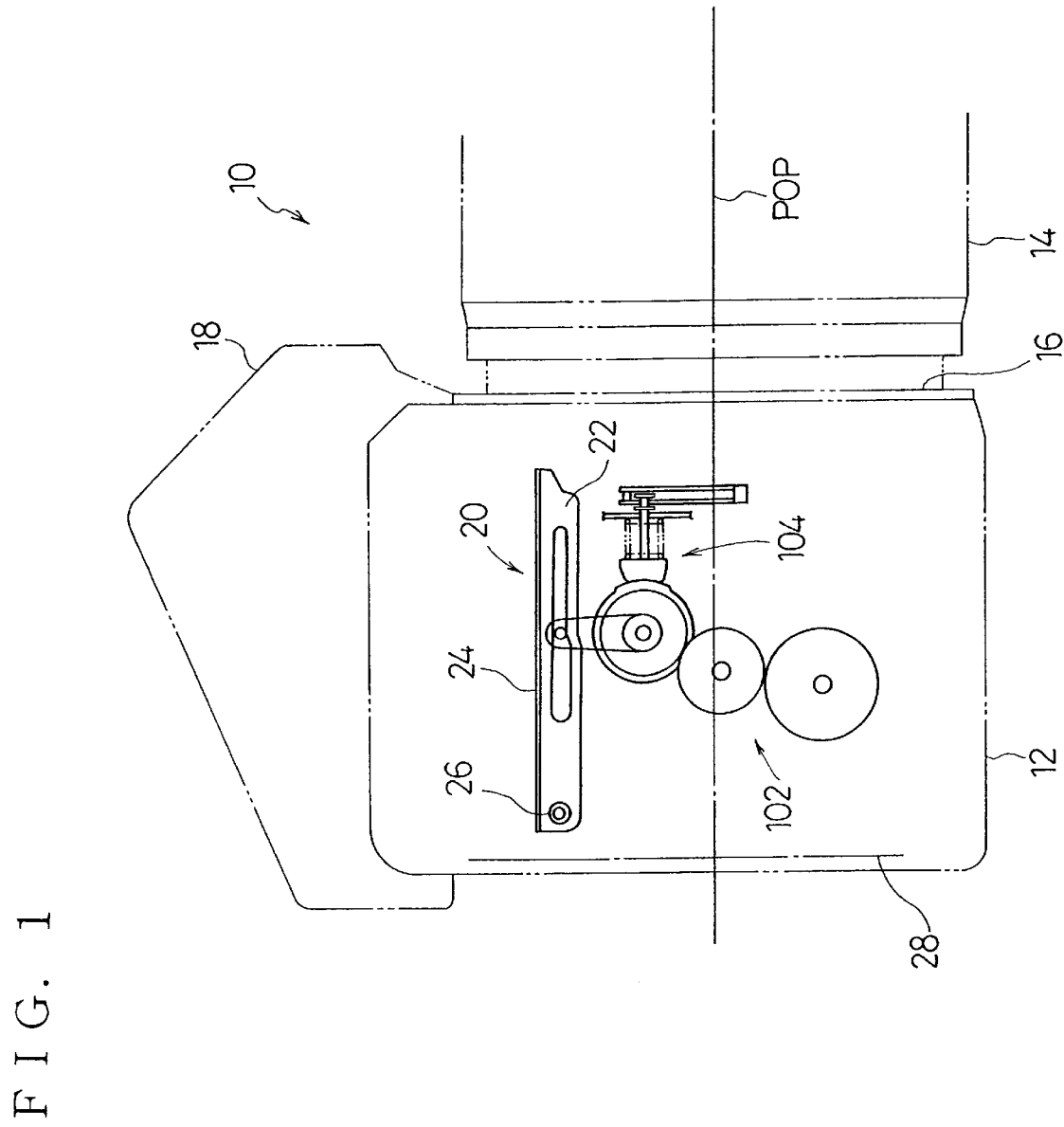
FIG. 1 is a side elevation of a single lens reflex camera having a mirror control apparatus constructed in accordance with a first embodiment of the present invention, in which some critical parts and elements of the mirror control apparatus are shown.

FIG. 1 shows a single lens reflex (SLR) camera 10, indicated by imaginary lines, for which provided is a mirror control apparatus 100 constructed in accordance with a first preferred embodiment of the present invention. The SLR camera 10 includes a camera body 12 and a lens 14. The camera body 12 has a lens mounting flange 16 on which the lens 14 is mounted in a conventional manner. The camera body 12 also includes a viewfinder 18 disposed at the top of the camera body 12 and having a pentaprism and an eyepiece (both not shown) as is well known in the art.

The camera body 12 defines a mirror room in which a mirror 20 is disposed. The mirror 20 comprises a mirror frame 22 and a mirror element 24 having a reflecting surface and attached to the mirror frame 22. The mirror 20 is supported by a support structure for reciprocal rotation between two end positions, referred to as the first and second positions hereinafter.

The support structure for the mirror 20 includes a pivot shaft 26 on which the mirror frame 22 is mounted for rotation about a longitudinal axis of the pivot shaft 26. Thus, the pivot shaft 26 defines an axis of rotation about which the mirror 20 reciprocally rotates, or flaps up and down. The pivot shaft 26 is disposed near top and rear walls of the mirror room and extending in a lateral direction of the camera 10, i.e., in a horizontal direction when the camera 10 is held in its normal orientation, where the viewfinder 18 lies upside of the camera as shown in FIG. 1.

Figure 2:
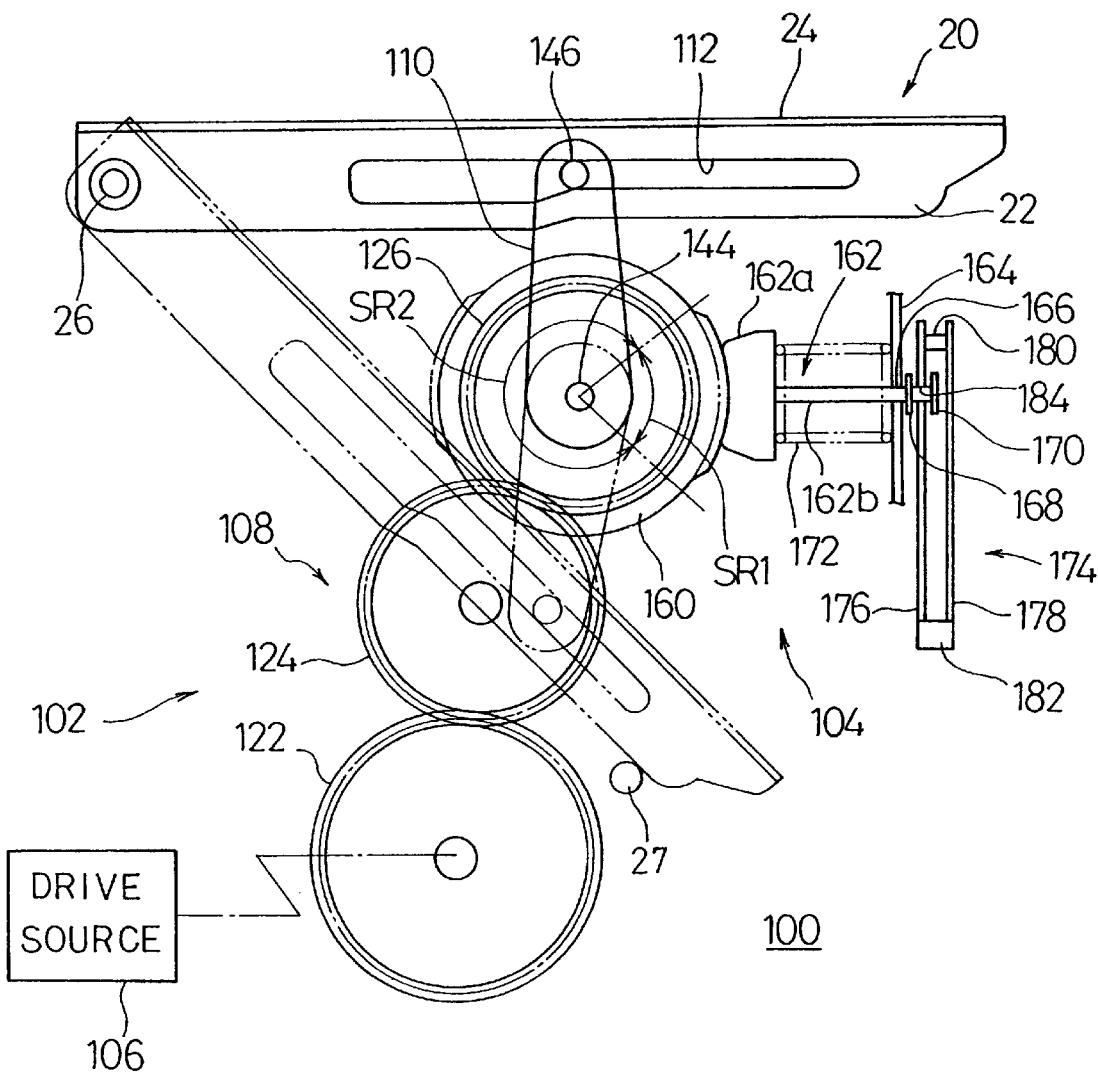
FIG. 2 is an enlarged side elevation of the mirror control apparatus of FIG. 1.

The mirror frame 22 comprises a pair of side members extending perpendicular to the pivot shaft 26. The support structure for the mirror 20 includes a pair of stop pins 27 (only one of them is shown in FIG. 2), which are disposed in the mirror room for engagement with the respective lower edges of the distal ends of the side members of the mirror frame 22 when the mirror 20 is in the first position. By virtue of this arrangement, the mirror 20 can rest on the stop pins 27 when placed in the first position as shown by imaginary lines in FIG. 2.

FIG. 1 also shows a photographing optical path POP along which the light coming through the lens 14 travels to the film 28 for exposure. When placed at the first position as indicated by imaginary lines in FIG. 2, the mirror 20 is in the photographing optical path POP and angled at forty-five degrees, serving to reflect the light coming through the lens 14 upward onto a viewing screen (not shown) of the viewfinder 18 to allow viewfinding. On the other hand, when placed at the second position as indicated by solid lines in FIG. 2, the mirror 20 is out of the photographing optical path POP, so that the light coming through the lens 14 is allowed to reach the film 28 through the shutter (not shown).

In this manner, the mirror 20 is supported for reciprocal rotation between the first position in the photographing light path POP and the second position out of the path POP. When a picture is taken, the mirror 20, which is normally positioned at the first position, is caused to rotate from the first position to the second position, then the shutter is released for exposure of the film 28, and thereafter the mirror 20 is caused to return to the first position. This sequence of motion of the mirror 20 is controlled by the mirror control apparatus 100 as described below.

The mirror control apparatus 100 comprises a drive mechanism 102 and a brake mechanism 104. The drive mechanism 102 is operatively connected to the mirror 20 for applying drive power to the mirror 20 for rotation between the first and second positions. The brake mechanism 104 is operatively connected to the mirror 20 for producing brake power which serves as resistance against rotation of the mirror 20. Significantly, in order to provide appropriate control over the motion of the mirror 20, the brake mechanism 104 is so constructed as to produce brake power which varies depending on at least one of factors affecting rotation of the mirror 20, as will be apparent from the following description.

The drive mechanism 102 comprises a drive source 106 (only schematically shown in FIG. 2), a gear train 108, a rotary arm 110 and a guide slot 112 formed in the mirror frame 22. The drive source 106 includes an electric motor and springs to be charged by the electric motor. The gear train 108 includes a first gear 122 for receiving drive power from the drive source, a second gear 124 in engagement with the first gear 122 and a third gear 126 in engagement with the second gear 124. The third gear 126 is mounted on and fixedly secured to a rotary shaft 144, to which the proximal end of the rotary arm 110 is also fixedly secured. The rotary shaft 144 extends parallel to the pivot shaft 26 of the mirror 20. The rotary arm 110 has a pin 146 attached thereto at its distal end and extending parallel to the pivot shaft 26 for the mirror 20. The guide slot 112 formed in the mirror frame 22 extends perpendicular to the pivot shaft 26 and receives the pin 146 therein, such that the pin 146 is movable along the guide slot 112. In this manner, a linkage is formed by the combination of the rotary arm 110, the pin146 attached to the rotary arm 110, the mirror frame 24 and the guide slot 112 formed in the mirror frame 24.

When the shutter button (not shown) of the camera 10 is pushed down by the photographer, the drive source 106 is operated by associated control circuitry (not shown) to produce drive power, which is transmitted to the gear train 108 so as to rotate the first, second and third gears 122, 124 and 126 and thus to rotate the rotary arm 110 fixedly connected to the third gear 126. The pin 146 carried on the distal end of the rotary arm 110 thereby goes around about the axis of the rotary shaft 144 to cause the mirror 20 to quickly rotate from the first to the second position, and then to return to the first position after exposure of the film 28. In order to avoid any harmful shocks to and bounces of the mirror 20, which could otherwise occur when the mirror 20 reaches the second position, the brake mechanism 104 is used.

The brake mechanism 104 comprises a friction brake. As shown in FIG. 2, the friction brake comprises i) a disk 160 operatively connected to and rotatable in synchronism with the mirror 20, ii) a brake shoe 162 supported by a stationary part of the camera body 12 for movement toward and away from the disk 160 and capable of contact with the disk 160 and iii) an urging device for urging the brake shoe 162 toward the disk 160 with a variable urging force compensated for a change in temperature in the camera body 12.

More specifically, the disk 160 is fixedly mounted on the rotary shaft 144 to which the third gear 126 of the gear train 108 is secured, so that the disk 160 is operatively connected to the mirror 20 through the rotary shaft 144, the rotary arm 110, the pin 146 on the arm 110 and the guide slot 112 in the mirror frame 22. The disk 160 has a nearly circular outer peripheral edge centered to the axis of the rotary shaft 144 and includes a first sectorial region SR1 having a first radius and a second sectorial region SA2 having a second radius slightly smaller than the first radius. The transitions between the sectorial regions SR1 and SR2 are shaped to have smooth, continuous curves.

Because of the shape of the disk 160, the brake shoe 162 can be in contact with the outer peripheral edge of the disk 160 in the first sectorial region SR1 while can not be in contact with it in the second sectorial region SR2. As the result, the brake mechanism 104 produces brake power only when the brake shoe 162 is travelling along the outer peripheral edge of the disk 160 in the first sectorial region SR1.

The brake shoe 162 comprises a head 162a and a stem 162b connected to and carrying the head 162a at a first end thereof. The camera body 12 has a wall 164 in which a hole 166 is formed. The stem 162b is received in and extends through the hole 166, so that the stem 162b has a second end thereof lying on that side of the wall 164 opposite to the brake shoe head 162a and thus to the disk 160. A pair of stops, referred to hereinafter as the first and second stops 168 and 170, are carried on and secured to the second end of the brake shoe stem 162b. The first stop 168 is nearer to the brake shoe head 162a than the second stop 170 is. The first stop 168 is engageable with the edge of the hole 166 formed in the wall 164, by virtue of which the first stop 168 serves as a stop for defining an end position of the brake shoe 162 at which the brake shoe 162 is nearest to the disk 160.

A helical spring 172 is compressed and interposed between the brake shoe head 162a and the wall 164, serving to urge the brake shoe 162 toward the end position and thus toward the disk 160. An elongate bimetallic element 174 is provided, which extends generally perpendicular to the brake shoe stem 162b and engageable with the second end of the stem 162b. The bimetallic element 174 serves to urge the brake shoe 162 toward and away from the disk 160 depending on temperature in the camera body 12.

As described above, the friction brake used in this embodiment includes the urging device for urging the brake shoe 162 toward the disk 160 with a variable urging force compensated for a change in temperature in the camera body 12. Specifically, the urging device comprises the helical spring 172 and the bimetallic element 174. The helical spring 172 serves as a first urging mechanism for urging the brake shoe 162 toward the end position with a substantially invariable urging force. The bimetallic element 174 serves as a second urging mechanism for urging the brake shoe 162 toward and away from the end position with a compensational urging force which varies depending on temperature in the camera body 12. By virtue of this arrangement, the brake shoe 162 is urged against the outer peripheral edge of the disk 160 in the first sectorial region SR1 with a resultant urging force produced by the first and second urging mechanisms which is compensated for a change in temperature in the camera body 12.

More specifically, the bimetallic element 174 comprises first and second metal strips 176 and 178 formed in the same size and made of different metallic materials having different thermal expansion ratios. The metal strips 176 and 178 extend parallel to each other and distant from each other in the direction of their thickness. The first metal strip 176 is nearer to the disk 160 than the second metal strip 178 is. The metal strips 176 and 178 have their upper ends connected to each other through a first spacer 180 and their lower ends connected to each other through a second spacer 182. With this arrangement, the bimetallic element 174 deflects when subjected to a change in temperature in the camera body 12. The bimetallic element 174 has its lower end fixedly connected to a stationary part of the camera body 12 and the upper end engageable with the second end of the brake shoe stem 162b, such that a deflection of the bimetallic element 174 caused by a change in temperature results in a displacement of the upper end of the bimetallic element 174 toward and away from the disk 160.

The first metal strip 176 has a hole 184 formed therein at its upper end, through which the second end of the brake shoe stem 162b extends. The first metal strip 176 lies between the first and second stops 168 and 170 on the second end of the brake shoe stem 162b. Each of the stops 168 and 170 is engageable with the edge of the hole 184 of the first metal strip 176. In this manner, the brake shoe stem 162b and the upper end of the first metal strip 176 are coupled to each other through a lost motion linkage formed by the stops 168 and 170 on the brake shoe stem 162b and the hole 184 formed in the first metal strip 176.

The metal strips 176 and 178 have sufficient resiliency so that they are capable of urging the brake shoe 162 toward and away from the disk 160 when the upper end of the first metal strip 176 is caused to engage with the first and second stops 168 and 170, respectively, by the deflection of the bimetallic element 174 in corresponding directions.

Referring next to FIGS. 3 to 6, operation of the friction brake when subjected to a change in temperature in the camera body 12 will be described.

Figure 3:
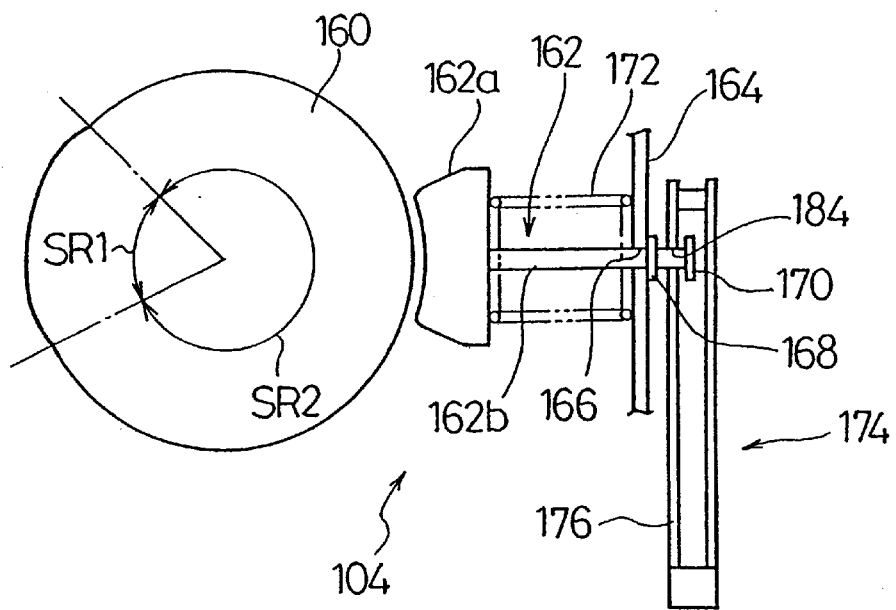
FIGS. 3 to 6 each shows a side elevation of a brake mechanism used in the mirror control apparatus of FIGS. 1 and 2.

FIG. 3 shows the friction brake under the condition where the mirror 20 is at the first position (as indicated by imaginary lines in FIG. 2) and the temperature in the camera body 12 is at an ordinary level, such as so-called standard room temperature. Because of the temperature at an ordinary level, the bimetallic element 174 is substantially straight in shape and its upper end is in engagement with neither of the stops 168 and 170 on the brake shoe stem 162b, so that the bimetallic element 174 does nothing to the brake shoe 162 at all. The brake shoe 162 is urged by the helical spring 172 and thereby retained at the end position defined by the first stop 168 on the stem 162b engaging with the edge of the hole 166 formed in the wall 164. The brake shoe head 162a is not in contact with the outer peripheral edge of the disk 160 because the second sectorial region SR2 having the smaller radius faces the brake shoe head 162a. Under this condition, no brake power will be produced against any motion of the mirror 20 which may be initiated.

Figure 4:
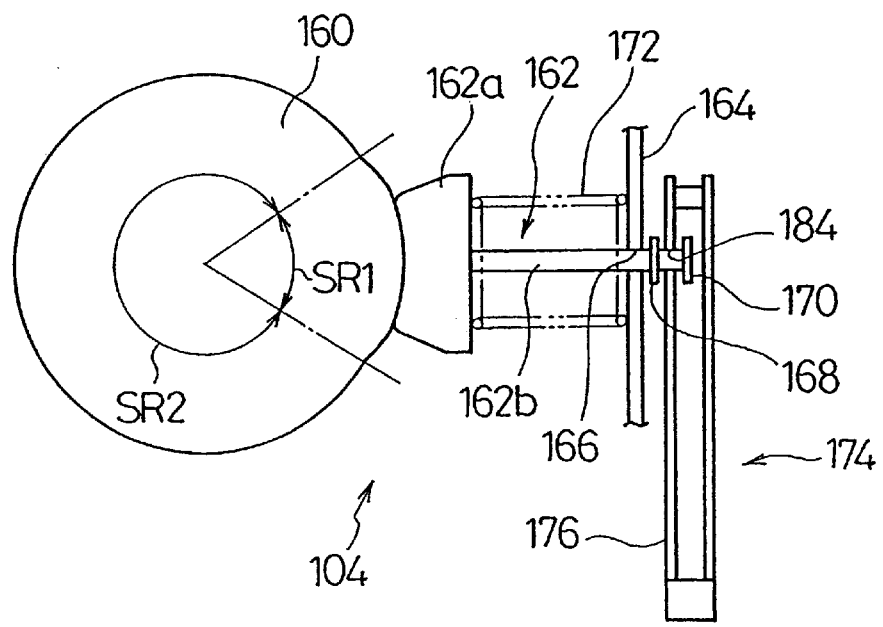

FIG. 4 shows the friction brake under the same condition as FIG. 3 except that the mirror 20 is at the second position (as indicated by solid lines in FIG. 2). When the shutter button is pressed down, the mirror 20 is driven by the drive mechanism 102 to rotate from the first to the second position, by which the position of the friction brake will change from that shown in FIG. 3 to that shown in FIG. 4. In FIG. 4, the brake shoe head 162a is in contact with the outer peripheral edge of the disk 160 because the first sectorial region SR1 having the greater radius faces the brake shoe head 162a. Under this condition, the friction brake will produce brake power against any motion of the mirror 20. Thus, when reaching the second position, the mirror 20 can be suitably decelerated so as to avoid any harmful shocks and bounces. It is also shown in FIG. 4 that the brake shoe 162 is slightly retracted from the end position due to the contact of the brake shoe head 162a with the disk 160, while the brake shoe 162 is urged against the edge of the disk 160 solely by the helical spring 172, i.e., the bimetallic element 174 again does nothing to the brake shoe 162 at all.

Figure 5:
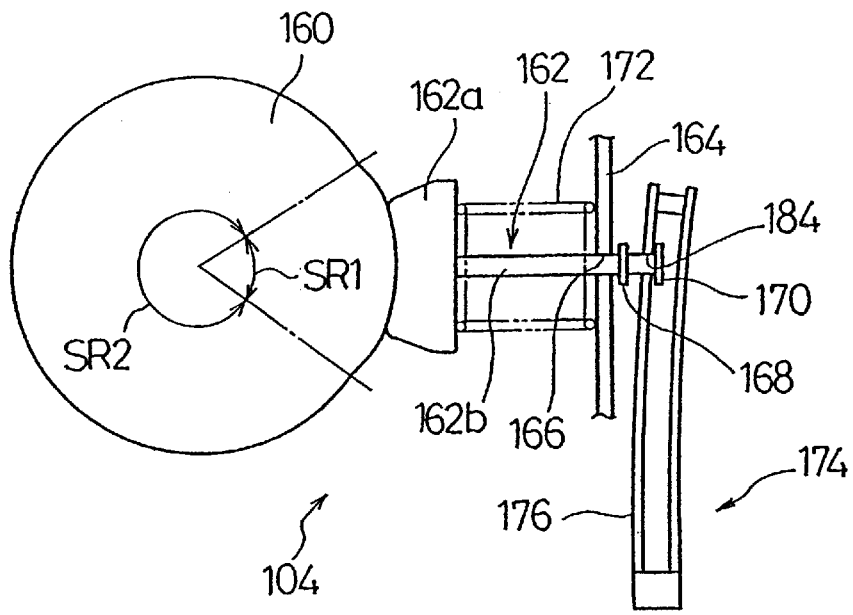

FIG. 5 shows the friction brake under the condition where the mirror 20 is at the second position and the temperature in the camera body 12 is at a relatively low level. Because of the temperature at a relatively low level, the bimetallic element 174 is curved such that the upper end thereof engages with the second stop 170 on the brake shoe stem 162b and serves to urge the stop 162 away from the disk 160. The resultant urging force acting on the brake shoe 162 equals the urging force from the helical spring 172 minus the urging force from the bimetallic element 174. Accordingly, the resultant urging force for urging the brake shoe 162 against the outer peripheral edge of the disk 160 reduces as temperature in the camera body 12 reduces. In other words, the resultant urging force is compensated for a change in temperature in the camera body 12. When the camera 10 is subjected to a relatively low temperature, the viscosity of lubricant applied to pivots and sliding parts in the camera 10 increases, resulting in an increase in resistance caused by lubricant against motions of moving parts. This in turn leads to a reduction in velocity of the mirror 20 being rotated, and thus to a reduction in the desired brake power. In the above arrangement, the brake power to be produced by the brake mechanism 104 reduces when the camera 10 is subjected to a relatively low temperature, so that suitable control of the mirror 20 may be achieved at such low temperature.

Figure 6:
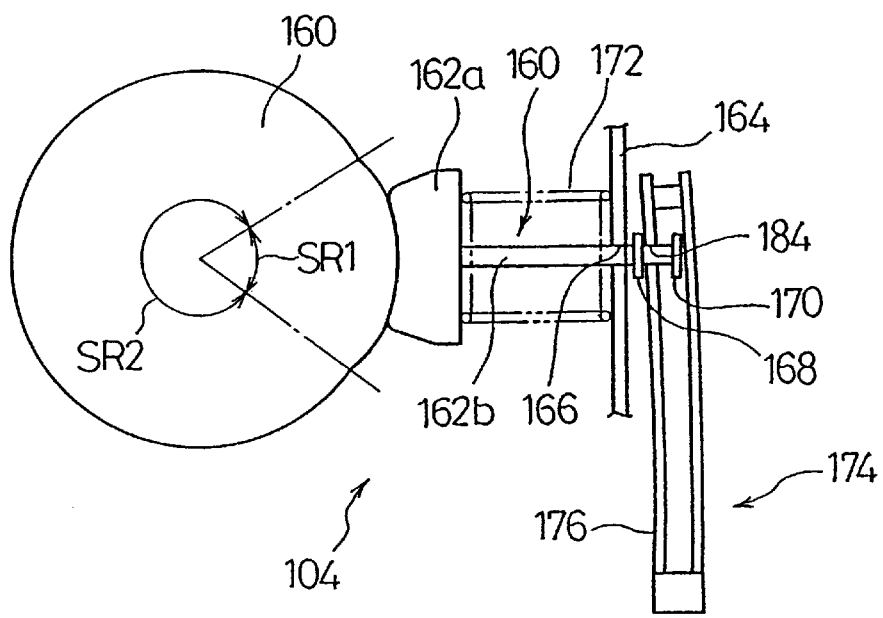

FIG. 6 shows the friction brake under the condition where the mirror 20 is at the second position and the temperature in the camera body 12 is at a relatively high level. Because of the temperature at a relatively high level, the bimetallic element 174 is curved such that the upper end thereof engages with the first stop 168 on the brake shoe stem 162b and serves to urge the stop 168 toward the disk 160. The resultant urging force acting on the brake shoe 162 equals the urging force from the helical spring 172 plus the urging force from the bimetallic element 174. Accordingly, the resultant urging force for urging the brake shoe 162 against the outer peripheral edge of the disk 160 increases as temperature in the camera body 12 increases. In other words, again, the resultant urging force is compensated for a change in temperature in the camera body 12. When the camera 10 is subjected to a relatively high temperature, the viscosity of lubricant applied to pivots and sliding parts in the camera 10 reduces, resulting in a reduction in resistance caused by lubricant against motions of moving parts. This in turn leads to an increase in velocity of the mirror 20 being rotated, and thus to an increase in the desired brake power. In the above arrangement, the brake power to be produced by the brake mechanism 104 increases when the camera 10 is subjected to a relatively high temperature, so that suitable control of the mirror 20 may be also achieved at such high temperature.

The above arrangement may be modified such that only reduction in brake power at a relatively low temperature is achieved while increase in brake power at a relatively high temperature is not. This modification is contemplated because the reduction in resistance against motions of moving parts at a high temperature is often far less significant than the increase in such resistance at a low temperature.

In the above arrangement, the brake mechanism 104 produces brake power only when the mirror 20 is travelling through a predetermined partial region within its rotational stroke between the first and second positions, i.e., brake power is produced only when the mirror 20 is reaching the second position. In this relation, another modification is contemplated such that the brake mechanism 104 is so constructed as to produce brake power when the mirror 20 is reaching each of the first and second positions. This may be achieved in a simple manner by modifying the shape of the disk 160 such that the disk 160 additionally has a third sectorial region which has a radius equal to the first radius of the first sectorial region SR1 and faces the brake shoe head 162a when the mirror 20 is at the first position.

Figure 7:
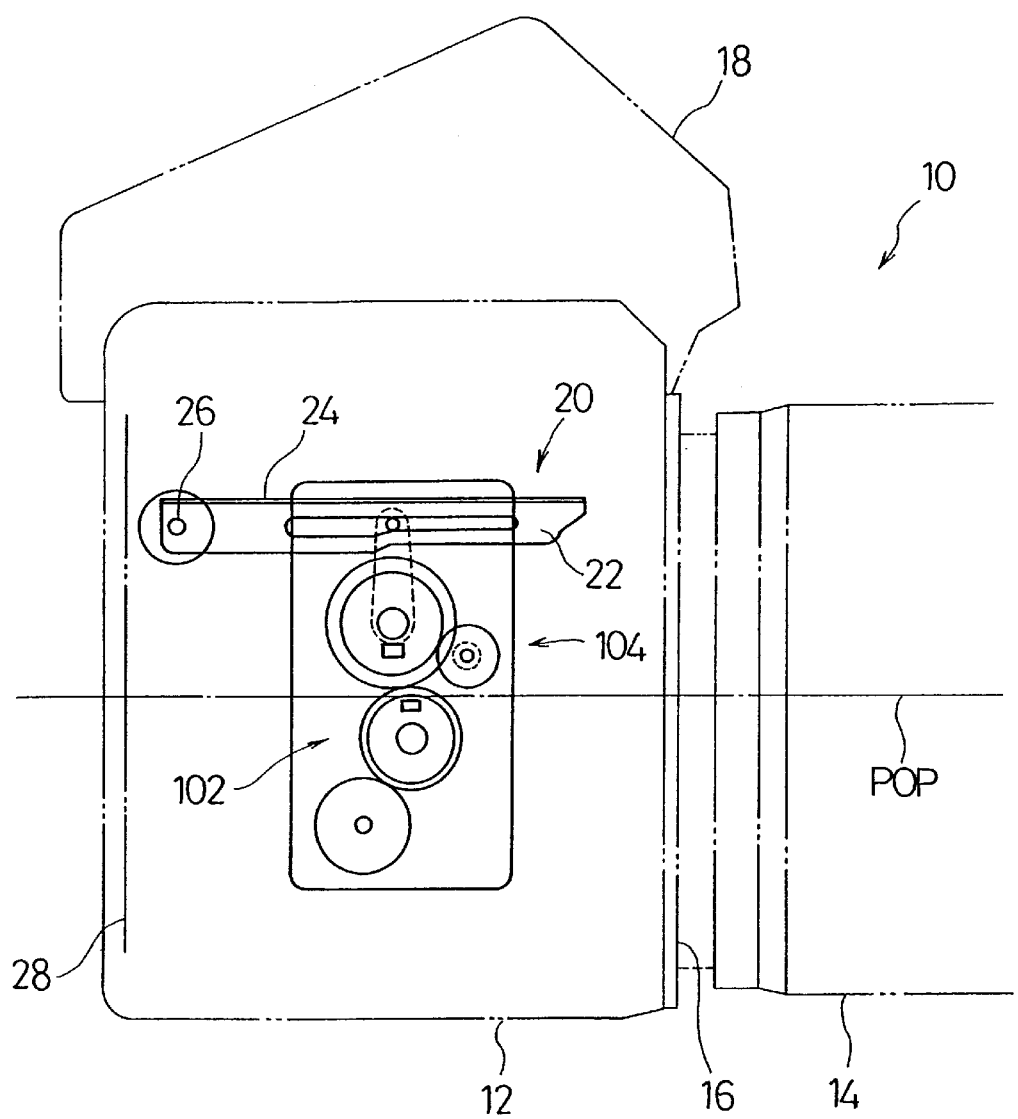
FIG. 7 is a side elevation of a single lens reflex camera having a mirror control apparatus constructed in accordance with a second embodiment of the present invention, in which some critical parts and elements of the mirror control apparatus are shown.
Figure 8:
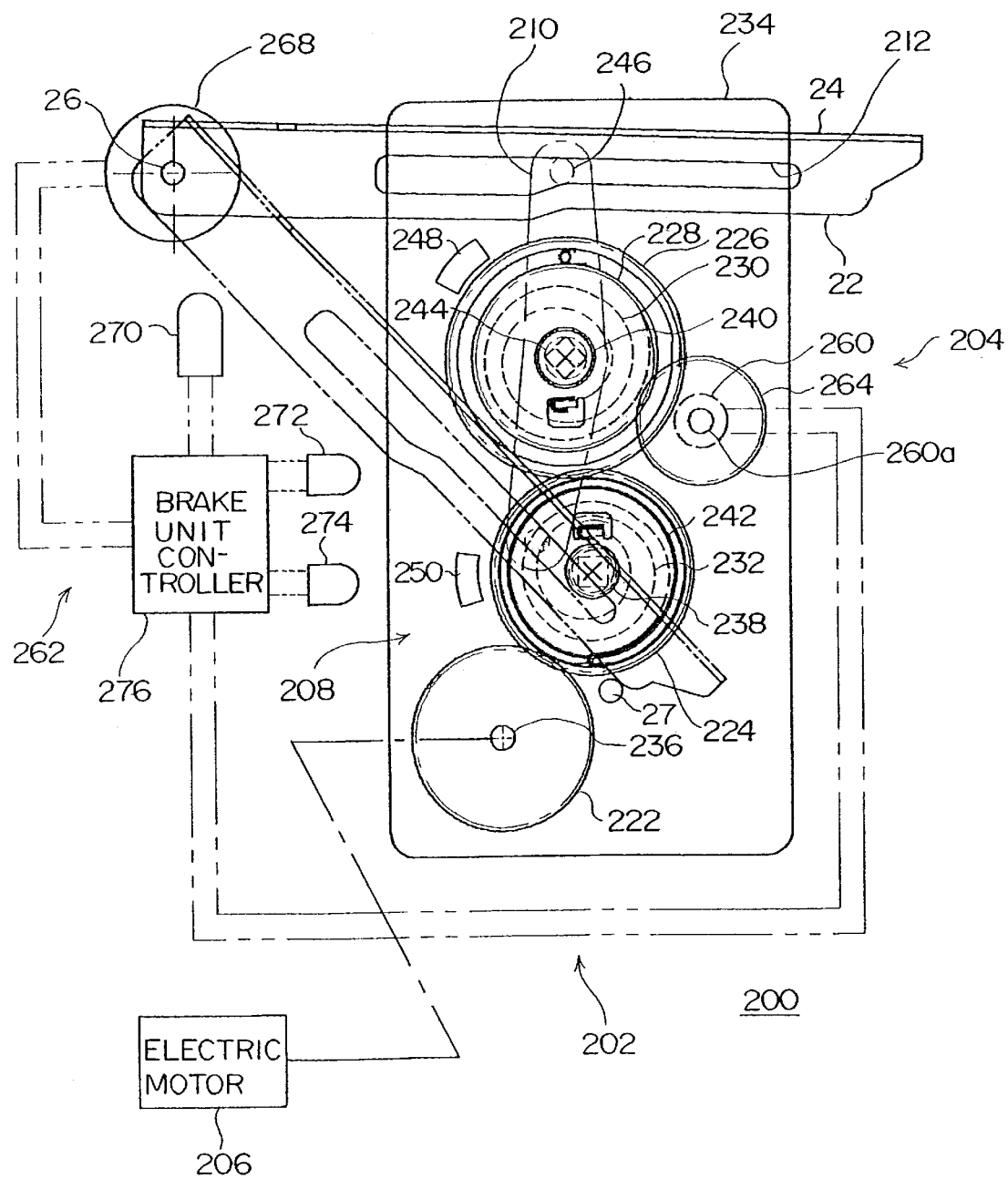
FIG. 8 is an enlarged side elevation of the mirror control apparatus of FIG. 7.
Figure 9:
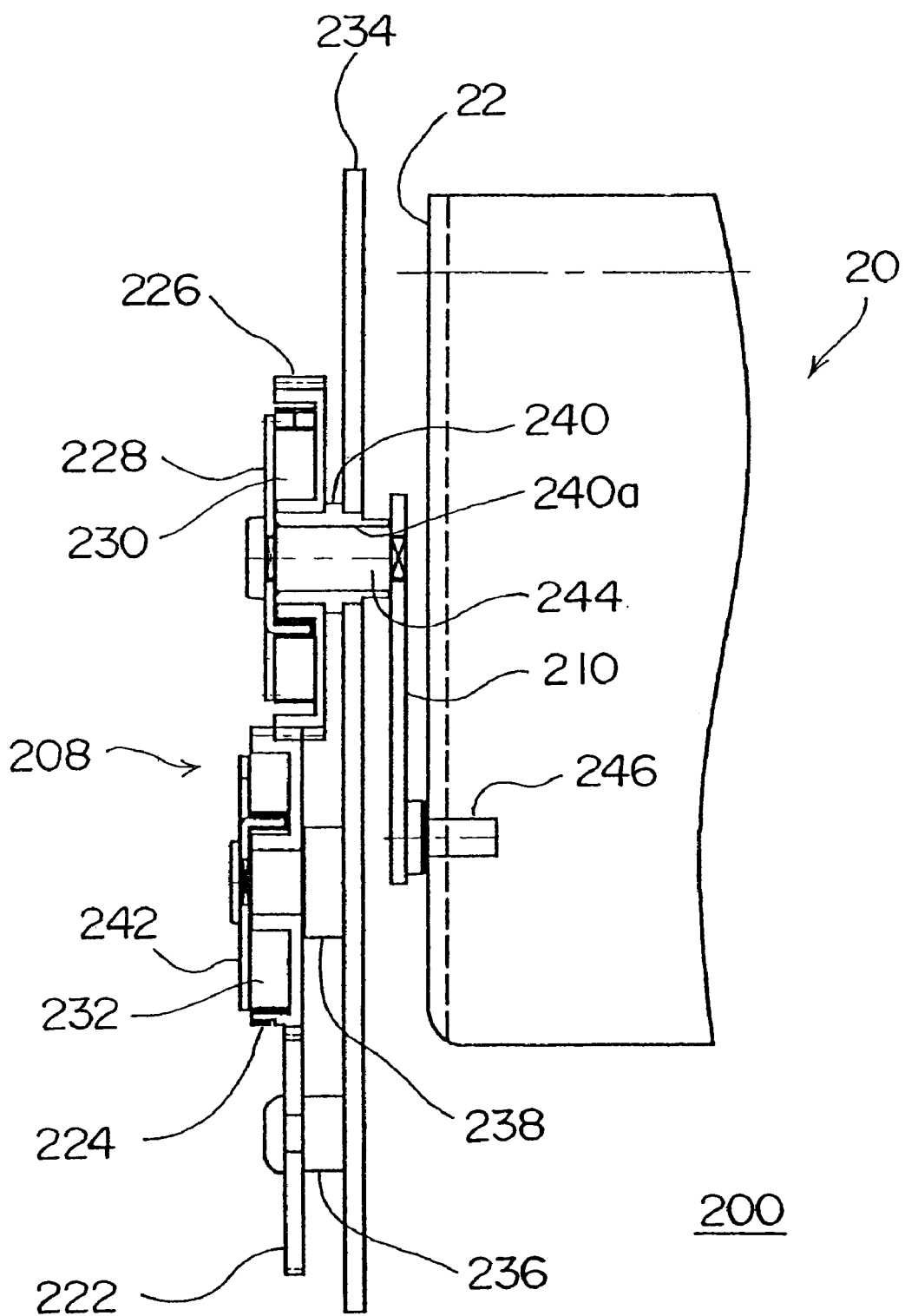
FIG. 9 is an enlarged frontal view of the mirror control apparatus of FIGS. 7 and 8.

Referring next to FIGS. 7 to 9, a mirror control apparatus 200 constructed in accordance with a second embodiment of the present invention will be described. The mirror control apparatus 200 of FIGS. 7 to 9 may be used in place of the mirror control apparatus 100 of FIGS. 1 to 6 and thus may be provided for a camera having a construction similar to that shown and described with reference to FIG. 1. Accordingly, the camera for which the mirror control apparatus 200 is provided will not be described in detail, and any parts of the camera corresponding to those of the camera 10 of FIG. 1 are indicated by the same or corresponding reference numerals.

As with the mirror control apparatus 100 of FIGS. 1 to 6, the mirror control apparatus 200 of FIGS. 7 to 9 comprises a drive mechanism 202 and a brake mechanism 204. The drive mechanism 202 is operatively connected to the mirror 20 for applying drive power to the mirror 20 for rotation between the first and second positions. The brake mechanism 204 is operatively connected to the mirror 20 for producing brake power which serves as resistance against rotation of the mirror 20. Significantly, in order to provide appropriate control over the motion of the mirror 20, the brake mechanism 204 is so constructed as to produce brake power which varies depending on at least one of factors affecting rotation of the mirror 20, as will be apparent from the following description.

The drive mechanism 202 comprises an electric motor 206 (only schematically shown in FIG. 8), a gear train 208, a rotary arm 210 and a guide slot 212 formed in the mirror frame 22. The gear train 208 includes a first gear 222 to be driven by the electric motor 206, a second gear 224 in engagement with the first gear 222, a third gear 226 in engagement with the second gear 224 and a fourth gear 228 coaxial with the third gear 226 and connected with the third gear 226 through a first spiral spring 230. The drive mechanism 202 further comprises a second spiral spring 232 which is connected to the second gear 224. The spiral springs 230 and 232 are charged by the electric motor 206 whenever the camera 10 is to be set ready for picture taking. Accordingly, the spiral springs 230 and 232 and the electric motor 206 together form a drive source for producing drive power to be applied to the mirror 20, operation of which is described later in detail.

The four gears 222 to 228 are supported by a rigid support plate 234 disposed in the camera body 12. Specifically, as shown in FIG. 9, the support plate 234 has three fixed, pivot pins 236, 238 and 240 secured thereto, of which the first and second are solid pins 236 and 238 and the third is a hollow pin 240 having a central, axial bore 240a.

The first gear 222 is fitted over and supported by the first pivot pin 236 for rotation.

The second gear 224 is fitted over and supported by the second pivot pin 238 for rotation. The second gear 224 has an annular recess formed therein on the outer side thereof, in which the second spiral spring 232 is received. A cover disk 242 is fixedly attached to the distal end of the second pivot pin 238 to cover the second spiral spring 232 in the annular recess. The second spiral spring 232 has opposite ends connected to the cover disk 242 and the second gear 224, respectively.

The third gear 226 is fitted over and supported by the third pivot pin 240 for rotation. The third gear 226 has an annular recess formed therein on the outer side thereof, in which the first spiral spring 230 is received.

A rotary shaft 244 is fitted through the axial bore 240a of the third pivot pin 240 and thereby supported by the third pivot pin 240 for rotation. The rotary shaft 244 has a first end fixedly connected to the fourth gear 228, so that the third and fourth gears 226 and 228 are coaxial to each other. The rotary shaft 244 has a second end fixedly connected to the proximal end of the rotary arm 210, so that the fourth gear 228 and the rotary arm 210 are fixedly interconnected through the rotary shaft 244.

The rotary shaft 244 extends parallel to the pivot shaft 26 for the mirror 20. The rotary arm 210 has a pin 246 attached thereto at its distal end and extending parallel to the pivot shaft 26 for the mirror 20. The guide slot 212 formed in the mirror frame 22 extends perpendicular to the pivot shaft 26 and receives the pin 246 therein, such that the pin 246 is movable along the guide slot 212. In this manner, a linkage is formed by the combination of the rotary arm 210, the pin246 attached to the rotary arm 210, the mirror frame 24 and the guide slot 212 formed in the mirror frame 24.

The drive mechanism 202 further comprises a first latch 248 (only schematically shown in FIG. 8) provided for the fourth gear 228 and a second latch 250 (again, only schematically shown in FIG. 8) provided for the second gear 224. Each of the latches 248 and 250 is controlled by associated control circuitry (not shown) to selectively prevent and allow the rotation of the associated gear.

In order to set the camera 10 ready for picture taking, the electric motor 206 is operated to drive the first gear 222 to rotate in one direction, during which the first latch 248 prevents the rotation of the fourth gear 228 so as to keep the mirror 20 at the first position (as indicated by imaginary lines in FIG. 8), while the second latch 250 allows the rotation of the second gear 224 so that the first, second and third gears 222, 224 and 226 are rotated by the electric motor 206. Through this operation, both the first and second spiral springs 230 and 232 are charged. Thereafter, the second latch 250 latches the second gear 224 so as to prevent the rotation of the first, second and third gears 222, 224 and 226.

When the shutter button is pressed down, the first latch 248 unlatches the fourth gear 228, so that the fourth gear 228 is rotated in one direction by the force of the first spiral spring 230 then to be released. The rotary arm 210 thereby drives the mirror 20 to rotate from the first to the second position (as indicated by solid lines in FIG. 8). After the mirror 20 reaches the second position, the shutter is released for exposure of the film 28, and then the second latch 250 unlatches the second gear 224. Then, the first, second, third and fourth gears 222, 224, 226 and 228 are rotated by the force of the second spiral spring 232 then to be released, and in particular, the fourth gear 228 is rotated in the opposite direction to that of the rotation caused by the first spiral spring 230. The rotary arm 210 thereby drives the mirror 20 to rotate from the second to the first position. In order to avoid any harmful shock to and bounces of the mirror 20, which could otherwise occur when the mirror 20 reaches the second position, the brake mechanism 204 is used.

The brake mechanism 204 comprises an induction brake unit 260 and control circuitry 262 associated with the induction brake unit 260. The induction brake unit 260 is formed of a DC electric motor having an output shaft 260a, on which a gear 264 is fixedly mounted. The gear 264 is in engagement with the fourth gear 228 of the drive mechanism 202. In this manner, the induction brake unit 260 is operatively connected to the mirror 20 through the fourth gear 228, the rotary shaft 244, the rotary arm 210, the pin 246 and the guide slot 212 formed in the mirror frame 22. As known, an output shaft and input terminals of an electric motor may serve as an input shaft and output terminals of an induction brake unit, respectively. By virtue of the operative connection between the induction brake unit 260 and the mirror 20, any rotation of the mirror 20 will cause corresponding rotation of the input shaft 260a of the induction brake unit 260 and thus produce corresponding voltage across the output terminals of the induction brake unit 260. The control circuitry 262 controls the current flowing through the induction brake unit 260 so as to control brake power produced by the induction brake unit 260. The current control may be achieved using a suitable current control device, such as a power transistor, and in a conventional manner for regenerative braking.

The control circuitry 262 associated with the induction brake unit 260 includes an angular position sensor 268, a temperature sensor 270, an orientation sensor comprised of a pair of mercury switches 272 and 274. The control circuitry 262 further includes a brake unit controller 276 electrically connected to these sensors.

The angular position sensor 268 detects the angular position of the pivot shaft 26 so as to detect the angular position of the mirror 20 relative to the camera body 12 and provides an angular position signal indicative of the detected angular position of the mirror 20, which is supplied to the brake unit controller 276.

The temperature sensor 270 detects the temperature in the camera body 12 and provides a temperature signal indicative of detected temperature in the camera body 12, which is supplied to the brake unit controller 276.

The orientation sensor, comprised of the pair of mercury switches 272 and 274, detects the orientation of the camera body 12 relative to the gravity and provides an orientation signal indicative of detected orientation of the camera body 12, which is again supplied to the brake unit controller 276. One of the mercury switches, 272, is disposed to detect such tilt of the camera body 12 in that the vertical axis of the camera body 12 is inclined substantially in fore-and-aft direction. The other of the mercury switches, 274, is disposed to detect such tilt of the camera body 12 in that the vertical axis of the camera body 12 is inclined substantially in lateral direction. Each of the mercury switches 272 and 274 is an on/off switch, the state of which depends on whether the tilt of the camera body 12 in the corresponding direction exceeds a certain, predetermined threshold.

Each of the mercury switches 272 and 274 provides a tilt signal indicative of whether the tilt exceeds the associated threshold, and the tilt signals from these switches 272 and 274 are combined to form the orientation signal to be supplied to the brake unit controller 276. Since the mercury switches 272 and 274 are on/off switches, each tilt signal is a binary state signal, which can only indicate whether the tilt of the camera body 12 exceeds the threshold or not. Alternatively, a multi-level sensor or a continuous-level sensor may be used in place of such an on/off switch.

As described, the brake unit controller 276 controls the current flowing through the induction brake unit 260. Currents may flow through the induction brake unit 260 when the unit is driven by a torque exerted to its input shaft 260a. The brake unit controller 276 includes a current control circuitry for controlling the current flowing through the induction brake unit 260 and a microcomputer for controlling the current control circuitry. The microcomputer examines the signals supplied from the angular position sensor 268, the temperature sensor 270 and the orientation sensor (272, 274) in order to make decisions for controlling the current control circuitry.

More specifically, the brake unit controller 276 examines the orientation signal from the orientation sensor (272, 274) to determine the orientation of the camera body 12 relative to the gravity, and estimates a possible increase/decrease in velocity of the mirror 20 which may result from the determined orientation.

The brake unit controller 276 further examines the temperature signal from the temperature sensor 270 to determine an existing increase/decrease in temperature in the camera body 12 with reference to the standard room temperature, and estimates a possible increase/decrease in velocity of the mirror 20 which may result from the determined increase/decrease in temperature in the camera body 12. The mirror 20 tends to rotate at higher velocity when the temperature in the camera body 12 is relatively high and thereby the viscosity of lubricant used is relatively low, while tends to rotate at lower velocity when the temperature is relatively low and the viscosity of lubricant is relatively high.

Then, the brake unit controller 276 totally determines whether and how the velocity of the mirror 20 would be higher/lower than the normal velocity, depending on both of the determined orientation of the camera body 12 and temperature in the camera body 12. If it is determined that the velocity of the mirror 20 would be higher than the normal velocity, the brake unit controller 276 allows more current to flow through the induction brake unit 260 so as to cause higher brake power to be produced when the mirror 20 is reaching the second position. If, however, it is determined that the velocity of the mirror 20 would be lower than the normal velocity, the brake unit controller 276 allows less current to flow through the induction brake unit 260 so as to cause lower brake power to be produced when the mirror 20 is reaching the second position.

It is of importance that such brake power is produced when the mirror 20 is reaching the second position because a primary purpose of braking operation resides in the avoidance of any harmful shocks to and bounces of the mirror 20, which could otherwise occur when it just reaches the second position. The brake unit controller 276 uses the angular position signal supplied from the angular position sensor 268 to cause the induction brake unit 260 to timely produce desirable brake power.

In this arrangement, the induction brake unit 260 can be controlled to produce desired magnitude of brake power with desired timing, so that appropriate brake power may be always produced against rotation of the mirror so as to effectively avoid any harmful shocks to and bounces of the mirror under different conditions of the single lens reflex camera which may occur.

As with the first embodiment, the timing for producing brake power may be modified such that it is produced when the mirror 20 is reaching each of the first and second positions. This modification may be achieved in a simple manner by modifying software program controlling operations of the microcomputer used in the brake unit controller 276.

Another modification may be contemplated such that the current control circuitry used in the brake unit controller 276 is so constructed as to inject electrical power into the induction brake unit 260 to enhance the maximum possible brake power produced by the induction brake unit 260.

Having described the present invention with reference to the preferred embodiments thereof, it is to be understood that the present invention is not limited to the disclosed embodiments, but may be embodied in various other forms without departing from the spirit and the scope of the present invention as defined by the appended claims.

What is claimed is:

1. A mirror control apparatus for a mirror in a single lens reflex camera, said mirror being supported for reciprocal rotation between a first position in a photographing light path and a second position out of said photographing light path, comprising:
   a drive mechanism operatively connected to said mirror for applying drive power to said mirror for rotation between said first and second positions; and
   a brake mechanism operatively connected to said mirror for producing brake power which varies depending on at least one of factors affecting rotation of said mirror, said brake power serving as resistance against rotation of said mirror.

2. A mirror control apparatus according to claim 1, wherein:
   said brake mechanism produces brake power only when said mirror is travelling through at least one predetermined partial region within its rotational stroke between said first and second positions.

3. A mirror control apparatus according to claim 2, wherein:
   said brake mechanism produces brake power when said mirror is reaching said second position.

4. A mirror control apparatus according to claim 2, wherein:
   said brake mechanism produces brake power when said mirror is reaching each of said first and second positions.

5. A mirror control apparatus according to claim 1, wherein:
   said brake mechanism produces brake power which varies depending on temperature in said camera.

6. A mirror control apparatus according to claim 1, wherein:
   said brake mechanism produces brake power which varies depending on orientation of said camera relative to the gravity.

7. A mirror control apparatus according to claim 1, wherein:
   said brake mechanism comprises a friction brake.

8. A mirror control apparatus according to claim 7, wherein:
   said friction brake comprises:
      a disk operatively connected to and rotatable in synchronism with said mirror;
      a brake shoe supported by a stationary part of said camera for movement toward and away from said disk and capable of contact with said disk; and
      an urging device for urging said brake shoe toward said disk with a variable urging force compensated for a change in temperature in said camera.

9. A mirror control apparatus according to claim 7, wherein:
   said friction brake comprises:
      a disk operatively connected to and rotatable in synchronism with said mirror about an axis, said disk having a nearly circular outer peripheral edge centered to said axis and including a first sectorial region of a first radius and a second sectorial region of a second radius slightly smaller than said first radius;
      a brake shoe supported by a stationary part of said camera for movement toward and away from said disk;
      a stop for defining an end position of said brake shoe at which said brake shoe is nearest to said disk;
      an urging device for urging said brake shoe toward said end position with a variable urging force compensated for a change in temperature in said camera; and
      said brake shoe, when in said end position, being capable of contact with outer peripheral edge of said disk in said first sectorial region while not capable of contact with outer peripheral edge of said disk in said second sectorial region, so that said brake mechanism produces brake power only when said brake shoe is travelling along said outer peripheral edge of said disk in said first sectorial region.

10. A mirror control apparatus according to claim 9, wherein:
   said urging device comprises:
      a first urging mechanism for urging said brake shoe toward said end position with a substantially invariable urging force; and
      a second urging mechanism for urging said brake shoe toward and away from said end position with a compensational urging force which varies depending on temperature in said camera;
      wherein said brake shoe is urged against said outer peripheral edge of said disk in said first sectorial region with a resultant urging force produced by said first and second urging mechanisms which is compensated for a change in temperature in said camera.

11. A mirror control apparatus according to claim 10, wherein:
   said second urging mechanism comprises an elongate bimetallic element which deflects when subjected to a change in temperature in said camera, said elongate bimetallic element having a first end fixedly connected to a stationary portion of said camera and a second end engaged with said brake shoe, such that a deflection of said bimetallic element caused by a change in temperature in said camera results in a displacement of said second end of said bimetallic element toward and away from said disk.

12. A mirror control apparatus according to claim 1, wherein:
   said brake mechanism comprises an induction brake unit and control circuitry associated with said induction brake unit.

13. A mirror control apparatus according to claim 12, wherein:
   said control circuitry comprises:
      an angular position sensor for detecting angular position of said mirror relative to said camera and providing an angular position signal indicative of detected angular position of said mirror;
      a temperature sensor for detecting temperature in said camera and providing a temperature signal indicative of detected temperature in said camera; and
      a brake unit controller responding to said angular position signal and said temperature signal by controlling said induction brake unit so as to control brake power to be produced by said induction brake unit.

14. A mirror control apparatus according to claim 12, wherein:
   said control circuitry comprises:
      an angular position sensor for detecting angular position of said mirror relative to said camera and providing an angular position signal indicative of detected angular position of said mirror;
      an orientation sensor for detecting orientation of said camera relative to the gravity and providing an orientation signal indicative of detected orientation of said camera; and a brake unit controller responding to said angular position signal and said orientation signal by controlling said induction brake unit so as to control brake power to be produced by said induction brake unit.

15. A mirror control apparatus according to claim 12, wherein:

said control circuitry comprises:

an angular position sensor for detecting angular position of said mirror relative to said camera and providing an angular position signal indicative of detected angular position of said mirror;

a temperature sensor for detecting temperature in said camera and providing a temperature signal indicative of detected temperature in said camera;

an orientation sensor for detecting orientation of said camera relative to the gravity and providing an orientation signal indicative of detected orientation of said camera; and a brake unit controller responding to said angular position signal, said temperature signal and said orientation signal by controlling said induction brake unit so as to control brake power to be produced by said induction brake unit.

16. A mirror control apparatus for a mirror in a single lens reflex camera, said mirror being supported for reciprocal rotation between a first position in a photographing light path and a second position out of said photographing light path, comprising:

a drive mechanism operatively connected to said mirror for applying drive power to said mirror for rotation between said first and second positions;

a brake mechanism operatively connected to said mirror for producing brake power serving as resistance against rotation of said mirror; and said brake mechanism comprising an induction brake unit and control circuitry associated with said induction brake unit, said control circuitry comprising:

an angular position sensor for detecting an angular position of said mirror relative to said camera and providing an angular position signal indicative of the detected angular position of said mirror; and a brake unit controller responding to said angular position signal by controlling said induction brake unit so as to control brake power to be produced by said induction brake unit.

17. A mirror control apparatus for a mirror in a single lens reflex camera, said mirror being supported for reciprocal rotation between a first position in a photographing light path and a second position out of said photographing light path, comprising:

a drive mechanism operatively connected to said mirror for applying drive power to said mirror for rotation between said first and second positions;

a brake mechanism operatively connected to said mirror for producing brake power serving as resistance against rotation of said mirror; and said brake mechanism comprising an induction brake unit and control circuitry associated with said induction brake unit, said control circuitry comprising:

an angular position sensor for detecting an angular position of said mirror relative to said camera and providing an angular position signal indicative of the detected angular position of said mirror;

a temperature sensor for detecting a temperature in said camera and providing a temperature signal indicative of the detected temperature in said camera; and a brake unit controller responding to said angular position signal and to said temperature signal by controlling said induction brake unit so as to control brake power to be produced by said induction brake unit.

18. A mirror control apparatus for a mirror in a single lens reflex camera, said mirror being supported for reciprocal rotation between a first position in a photographing light path and a second position out of said photographing light path, comprising:

a drive mechanism operatively connected to said mirror for applying drive power to said mirror for rotation between said first and second positions;

a brake mechanism operatively connected to said mirror for producing brake power serving as resistance against rotation of said mirror; and said brake mechanism comprising an induction brake unit and control circuitry associated with said induction brake unit, said control circuitry comprising:

an angular position sensor for detecting an angular position of said mirror relative to said camera and providing an angular position signal indicative of the detected angular position of said mirror;

an orientation sensor for detecting an orientation of said camera relative to gravity and providing an orientation signal indicative of the detected orientation of said camera; and a brake unit controller responding to said angular position signal and to said orientation signal by controlling said induction brake unit so as to control brake power to be produced by said induction brake unit.

19. A mirror control apparatus according to claim 18, wherein:

said orientation sensor comprises a pair of mercury switches, one disposed to detect such tilt of said camera in that a vertical axis of said camera is inclined substantially in fore-and-aft direction and the other disposed to detect such tilt of said camera in that said vertical axis of said camera is inclined substantially in lateral direction.

20. A mirror control apparatus for a mirror in a single lens reflex camera, said mirror being supported for reciprocal rotation between a first position in a photographing light path and a second position out of said photographing light path, comprising:

a drive mechanism operatively connected to said mirror for applying drive power to said mirror for rotation between said first and second positions;

a brake mechanism operatively connected to said mirror for producing brake power serving as resistance against rotation of said mirror; and said brake mechanism comprising an induction brake unit and control circuitry associated with said induction brake unit, said control circuitry comprising:

an angular position sensor for detecting an angular position of said mirror relative to said camera and providing an angular position signal indicative of the detected angular position of said mirror;

a temperature sensor for detecting a temperature in said camera and providing a temperature signal indicative of the detected temperature in said camera;

an orientation sensor for detecting orientation of said camera relative to gravity and providing an orientation signal indicative of the detected orientation of said camera; and a brake unit controller responding to said angular position signal, said temperature signal and said orientation signal by controlling said induction brake unit so as to control brake power to be produced by said induction brake unit.

21. A mirror control apparatus according to claim 20, wherein: said orientation sensor comprises a pair of mercury switches, one disposed to detect such tilt of said camera in that a vertical axis of said camera is inclined substantially in fore-and-aft direction and the other disposed to detect such tilt of said camera in that said vertical axis of said camera is inclined substantially in lateral direction.

* * * * *